INSERTION MACHINE

Filed Sept. 8, 1969 2 Sheets-Sheet 1

INVENTORS
Eugene Sather
Lester H. Stocker &
Kenneth A. Hams
BY
Griffin, Branigan and Kindness
ATTORNEYS INVENTOR
Eugene Sather
Lester H. Stocker &
Kenneth A. Hams
BY Griffin, Branigan and Kindness
ATTORNEY United States Patent Office
3,606,728
Patented Sept. 21, 1971

3,606,728

INSERTION MACHINE

Eugene Sather, Washington, and Lester H. Stocker, Phillipsburg, N.J., and Kenneth A. Hams, Easton, Pa., assignors to Bell and Howell Company, Phillipsburg, N.J.

Filed Sept. 8, 1969, Ser. No. 855,805
Int. Cl. B65b *57/04*
U.S. 53—54 24 Claims

ABSTRACT OF THE DISCLOSURE

A selective insertion machine has a first document feeder for delivering main documents onto a first portion of an insertion track at the rate of at least one such main document for each machine cycle. A second document feeder contains sets of subordinate documents wherein each set is associated with a given main document. The second document feeder operates at a high speed so as to feed an entire set of subordinate documents during a given machine cycle and place that set on the insert track with the previously fed associated main document. The main documents contain count indicia representative of the number of associated subordinate documents that are to be subsequently fed by the high speed feeder. These indicia are sensed along with control indicia and representative count and control signals are generated. The associated subordinate documents are then counted as they are fed from the high speed feed and a comparator compares the two counts to generate an error signal if they differ.

A second portion of the insert track takes each group of main and associated documents past insertion stations which selectively insert additional material with each group in accordance with the control signals generated in response to the control indicia on the main documents. The insertion track then moves the thusly formed groups past both a device for selectively stuffing each group into envelopes and a sealing station where the envelopes are selectively sealed. Next, the second portion of the insert track moves the stuffed envelopes past an error stacking station, a hold stacking station, and an overweight stacking station. The error stacker is operative in response to an error signal from the comparator to remove stuffed envelopes from the insert track. The hold stacker is operative to remove selected envelopes from the insert track in response to control signals derived from that envelope's main document. The overweight stacker is operative to remove selected envelopes from the insert track when they weigh more than a predetermined amount. Those documents which successfully pass the stacking stations are delivered to a postage meter.

BACKGROUND OF THE INVENTION

This invention relates to an improved multi-station insertion machine of the type described in quite some detail in U.S. Pats. 2,325,445 and 3,260,517. Both of these patents relate to multi-station inserters which are presently produced and marketed by the assignee of the present application and well-known in the market as the Phillipsburg inserters.

In both of the above-noted patents, a master control document is withdrawn from a master control document station and moved onto an inserter track which has a suitable conveyor means for moving the master control document past a plurality of insertion stations. As the master control document is thusly moved, additional documents from the insertion stations are stacked with the master control document. The master control document and its insertions are then inserted into a mailing envelope by well-known means.

U.S. Pat. 3,260,517 is particularly directed to an improvement of Pat. 2,325,455 and release to a device for deriving signals from a particular master control document and using those signals to control the subsequent insertion of documents from only selected insertion stations. As the demands of automated document handling have increased, however, it has become apparent that the mere use of master control documents is not adequate to satisfy the control requirements for more sophisticated insertion machines. That is, those which include not only many insertion stations as such, but a plurality of integrated stackers and separate high speed feeders for delivering specific numbers of documents onto the insert track so as to be placed in a packet with particular master documents. For example, as set forth in more detail shortly in connection with a preferred embodiment of the invention, the requirements of the banking community have become particularly demanding. In the handling of a conventional monthly statement for a bank's checking account customer, for example, a given statement may comprise several sheets of payment and deposit entries. These sheets must then be matched up with a number of cancelled checks, deposit receipts, and charge slips. Moreover, it is imperative that there be a check or the like corresponding to each entry on the particular depositor's statement.

After the checks and statements are counted and placed together, it is desired that they be moved past a plurality of conventional insertion stations to have materials collectively added thereto. Then, prior to mailing, it is desired that selected packets be withdrawn such as, for example, where it develops that one of a particular depositor's checks is missing. Similarly, it might be desired that particular statements be withdrawn for closer examination because the account has been overdrawn or perhaps because it is unusually active. In this respect, statements for the more active accounts might require more postage than that for which the postage meter is set. Hence, statements for the more active accounts might be selectively withdrawn for that reason. In any event, the previously developed insertion machines have simply not been adequate to meet demands such as those just described.

Attempts have certainly been made to solve the above-noted problems. For example, commonly assigned U.S. Pat. 3,490,761 describes a device using a high speed feeder for feeding a master document followed by one or more subordinate documents. This, for example, could be a blank statement followed by a plurality of checks. This, however, requires that the statements and checks be collated into an integrated stack prior to their operation in connection with the insertion machine. A solution to this problem is in turn set forth in commonly assigned U.S. Pat. 3,484,100 which was filed on July 14, 1967. The structure described in that application, however, requires two high speed feeders; one for feeding master documents (such as bank statements) and another for feeding related documents (such as associated checks). In addition, because of the difficulty in reading control information on documents passing from high speed feeder, that structure uses a separate control document to control the selective insertion of material to be placed with each group of statements and checks as in the case of a bank machine. Consequently, it is necessary that there be a matching operation to be sure that the related documents from the two high speed feeders are indeed those which are intended; and that the subsequent insertions therewith are in fact being controlled by the proper control document. Hence, it is an object of this invention to provide an improved insertion machine which both meets the demands of the current business community and eliminates the requirement for both the separate control document and one of the high speed feeders.

Another object of the invention is to provide an insertion machine wherein control indicia on the main document not only control the operations of the machine's various insertion stations, but the main document's feeder and the insert track itself. In this respect, as described in the above-noted U.S. Pat. 3,490,761, automated control of insert tracks has previously been accomplished by electromechanical means. These controls, however, are not sufficiently reliable for high speed machines. Hence, it is a related object of this invention to provide a structure for controlling the insert track by means of indicia which are prerecorded on the main documents themselves.

Another object of the invention is to provide an improved device for insuring that the desired number of related documents from a second feeding station are delivered to the insert track so as to be combined with their related master document which has been previously fed from a first feeding station.

Still another object of the invention is to provide a structure for selectively removing packets of documents from the insert track for any one of a variety of reasons such as because the particular packet is overweight or because a detection has been made that it is missing a document.

Frequently, as noted above in connection with bank statement machines, a master document might be comprised of several sheets. Where feeders are used which deliver only one document per machine cycle, therefore, it has been necessary to terminate operation of the entire insertion track while the subsequent main document sheets are delivered to the insertion track. Consequently, it is another object of this invention to provide a machine having an improved "demand feed" function where a conventional feeder is used to place all of a main document's sheets together onto the insert track, but the previously fed document packets are permitted to continue along their insertion paths.

In accordance with principles of the invention, when described in terms of its preferred embodiment, a stack of bank statements is placed in a conventional feeder at a main document station so as to be fed onto a first portion of an insert track. The bank statements have prerecorded thereon a plurality of control and count indicia. The count indicia represent the number of checks or the like that are to be subsequently placed with the statement and mailed to the customer. One of the control indicia indicates whether the particular statement is comprised of more than one sheet. As the statements are fed, the indicia are sensed and signals generated for passage to a control means for selectively controlling subsequent insertion stations, integral stacking stations and related stations for operations such as stuffing and sealing.

The various checks and deposit slips to be placed with each depositor's statement are located at a high speed feeding station which is adapted to feed all of a given depositor's checks and slips onto the insertion track when the related statement is adjacent thereto. In this respect, the control means is operative in response to the control signals derived from the statements to control the high speed feeder. For example, if the statement indicates that a given depositor's statement is not to be accompanied by checks or slips, the control means selectively terminates operation of the high speed feeder to insure that the next depositor's checks are not placed with the statement for the inactive account.

The first portion of the insert track terminates before the high speed feeder and is also under control of the control means. The second portion of the insert track is continuously movable to transport previously placed document packets past the high speed feeder and the various insertion, stuffing, sealing, and stacking stations which are selectively operated by the control means in response to the control signals derived from the various statements. In this manner, while the largest portion of the insertion machine continues to operate, the first portion is stopped in response to signals from a given statement to the control means indicating that the given statement is comprised of more than a single sheet. In this respect, for practical reasons to be described more fully later, the control indicia for this function are located on the second and subsequent sheets of a given statement. Hence, the control means receives its signals for controlling the first portion of the insert track after the first statement sheet is fed. Consequently, the control means includes a memory for temporarily storing the information derived from the various statements. In this manner, the information is not lost between the time a first statement sheet is fed and the time the control indicia on that statement's second sheet are sensed.

BRIEF DESCRIPTION OF THE DRAWINGS

The foregoing and other objects, features, and advantages of this invention will be apparent from the following more particular description of preferred embodiments thereof as illustrated in the accompanying drawings wherein the same reference numerals refer to the same parts throughout the various views. The drawings are not necessarily intended to be to scale, but rather are presented so as to illustrate the principles of the invention in clear form.

In the drawings.

DETAILED DESCRIPTION

Figure 1:
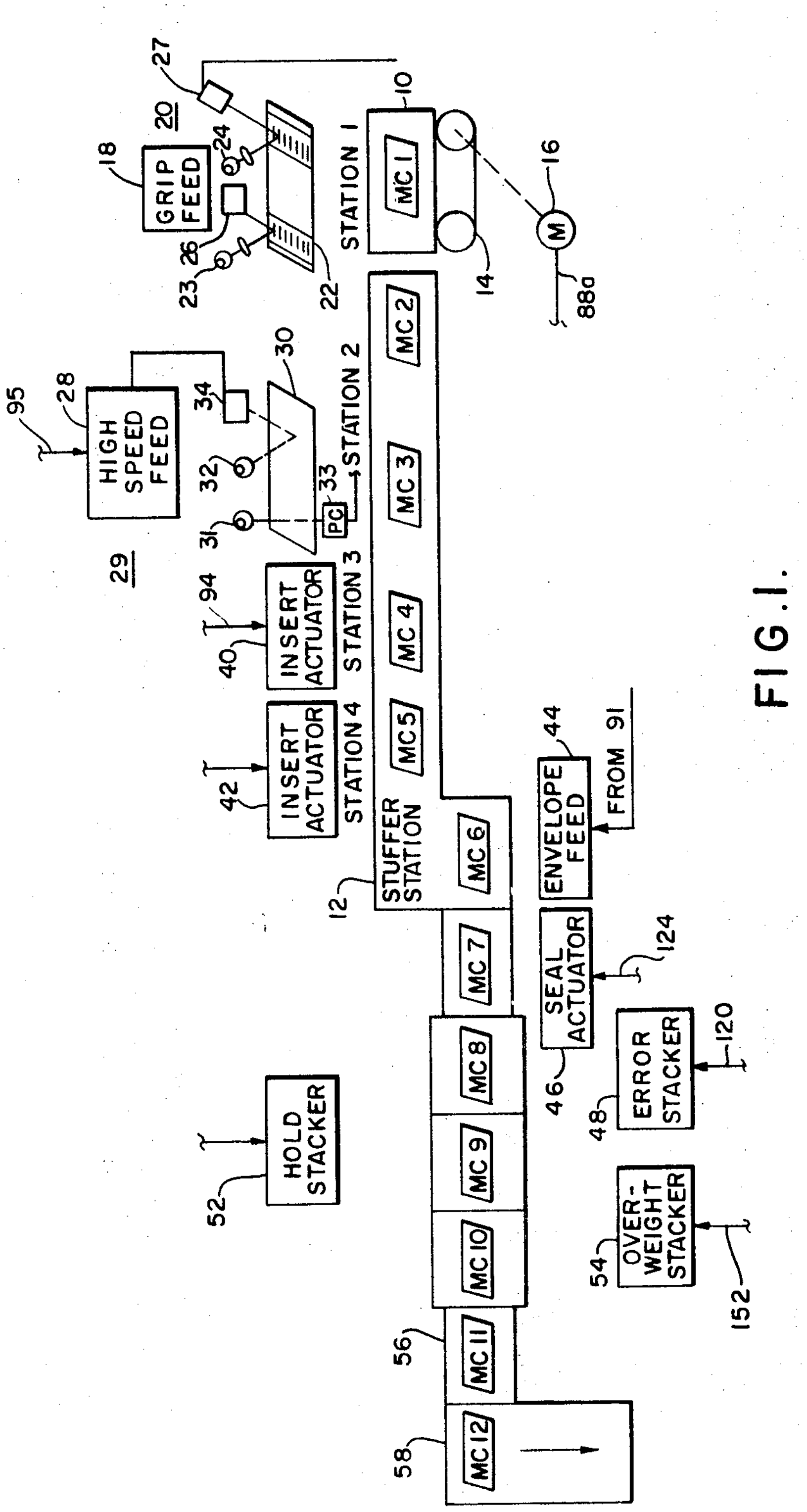
FIG. 1 is a schematic drawings of the various stations of an insertion machine embodying the principles of the invention; and, FIG. 2 is a schematic drawing of a control means for use in connection with the insertion machine illustrated in FIG. 1.

In FIG. 1, the feed track of an insertion machine is divided into first and second portions 10 and 12. The first portion is intermittently driven by a chain and sprocket arrangement schematically illustrated as 14 which, in turn, is driven by a motor 16. The second portion 12 is driven by a suitable means not shown.

Figure 2:
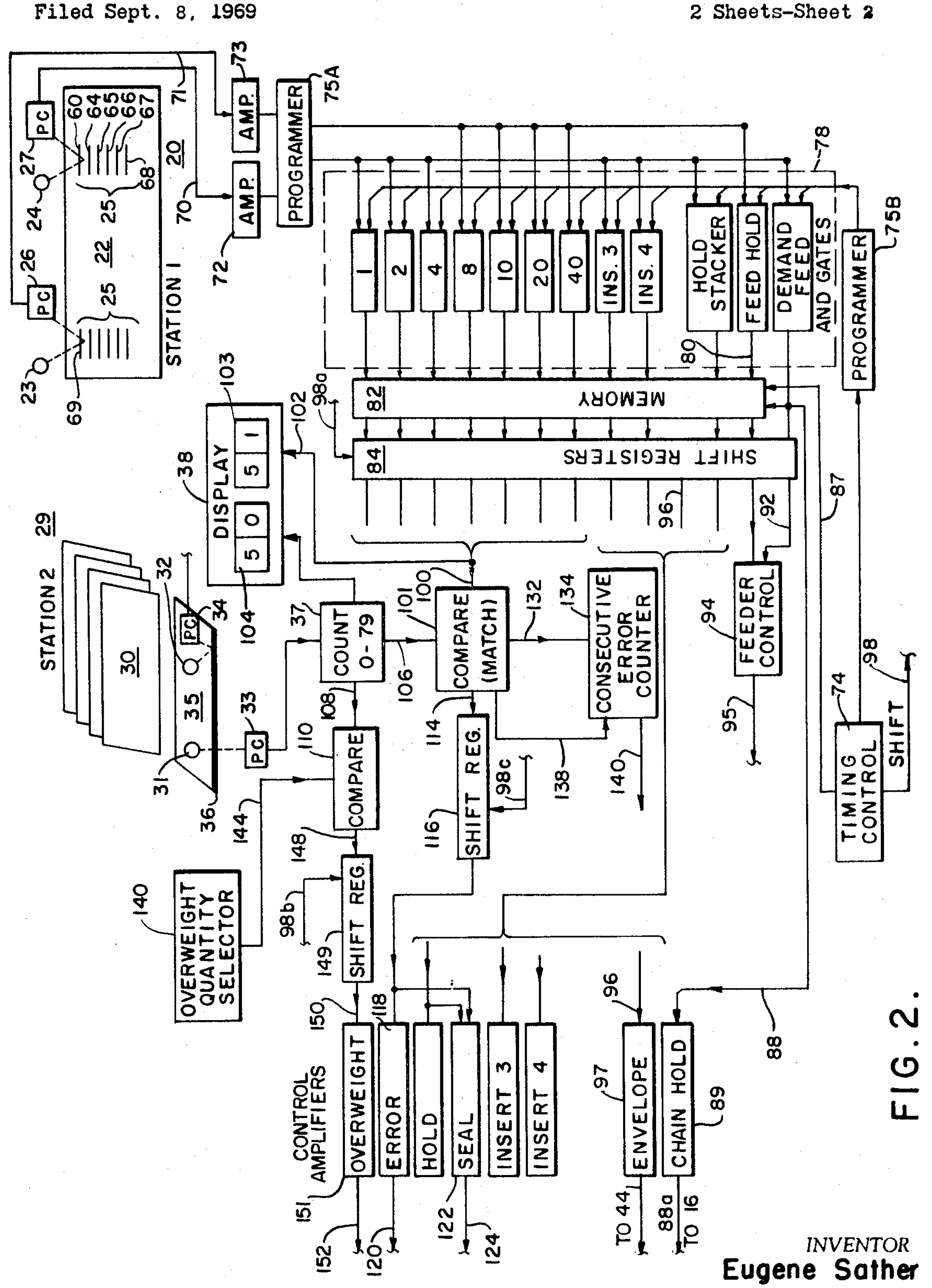

A conventional gripper-vacuum feed mechanism 18 is located at a first document feeding station 20 and is operative to feed documents such as bank statements or the like 22 under photocell scanning structures wherein reflection of light from lamps 23 and 24 to related photocells 26 and 27 is interrupted by marks in fields 25 (FIG. 2). In this respect, as will be described more fully later, the mark in the fields 25 comprise control and count indicia for the bank statements 22 and are operative to cause variations in the intensity of the light reflected from the bank statement resulting in pulsed outputs from the photocells 26 and 27 when the documents pass thereunder.

A second feeding mechanism 28 is a high speed feeder located at a second station 29 for delivering sets of checks such as 30 past additional photocell sensing mechanisms comprised of lamps 31 and 32. Light from lamp 31 is interrupted in its passage toward photocell 33 as checks 30 pass therebetween. Light from lamp 32 is reflectively directed from checks 30 toward photocell 34. As shown in FIG. 2, the checks 30 are arranged in a hopper in sets which are separated by dividers 35 having darkened strips 36 along the leading portions thereof. In this manner, the darkened strips 36 alter the output from the photocell 34 to indicate that the high speed feeder is about to feed a new set of checks. Similarly, as each divider 35 and its following set of checks 30 is fed from the high speed feeder 28, the photocell 33 produces an output pulse which is delivered to a counter 37 which, in turn delivers count signals to a display device 38 to be described more fully later.

The gripper feed 18 and the high speed feeder 28 are separated from each other by a distance corresponding to that traveled by a portion of the insert track during a given machine cycle which is generally defined as the normal time between arrival of a packet of documents at one station until the time it arrives at the next station. In this connection, and in the absence of overriding factors to be described later, a given bank statement such as 22 is fed from the gripper feed 18 and onto the first portion of the insert track during a machine cycle which is schematically illustrated as MC1 in FIG. 1. During the next machine cycle the statement, is passed from the first portion 10 of the insert track to the second portion 12 into a position illustrated as MC2. During subsequent machine cycles the statement is moved past the high speed feeder 28 (MC3) and a first insert actuator 40 at station 3 (MC4) which, if selected, is operative to place one or more pieces of insert material with the main document from station 1 and its related checks or "subordinate documents" from station 2. The packet of documents is then moved past a second insert station (4—at MC5) having an insert actuator 42, and then on to an envelope stuffing station where envelopes are selectively fed by an envelope feed 44 to a position so that each packet is stuffed into a corresponding envelope by a stuffer. At this point, it will be appreciated by those skilled in the art that although only two insert stations have been illustrated, many more can be and are conventionally employed.

After each packet of material is stuffed into its corresponding envelope it is directed past a sealing station where a selectively operable sealing actuator 46 seals the envelopes and passes them along the insert track under vertical stacking stations illustrated in the drawings as error stacker 48, hold stacker 52 and overweight stacker 54. These stackers are selectively operable as will be described later and extend above the insert track. If it is desired, for example, that the packet containing the initial bank statement be removed from the insert track during machine cycle 9 (MC9) when it is under the hold stacker 52, a platform, not shown, moves the packet upwardly where it is grasped by stacking fingers (not shown) and held above the insert track in the hold stacker 52. Stacking structures of this type are conventional. Hence, they will not be further described.

After each document passes under the various stackers it moves through a postage meter 56 at MC11. In the preferred embodiment, the postage meter is set for a fixed postage to eliminate the need for a weighing mechanism prior to the meter. After suitable postage is affixed, the envelopes are directed to a conveyor mechanism 58 which carries the envelopes to a final position.

In connection with the operation of a checking account, a depositor's statement sheet has an entry placed thereon for each check, deposit, or other charge that is made to the depositor's account during the course of a given month. For more active accounts, several statement sheets might be required because a single sheet is not large enough to contain all of the month's entries. Hence, it will be appreciated that when a statement for such an active account is ready to be fed from the grip feeder 18, some additional precautions must be taken to insure that all of the depositor's statement sheets are placed on the insert track together. This could easily be done by merely temporarily terminating the operation of the remainder of the insertion machine's various stations and not placing them "back on the line" until after all of the active account's statement sheets have been delivered to the insert track. This termination of the operation of the remainder of the machine, however, is undesirable; and it is for this reason that the insert track of the instant machine is divided into first and second portions.

The marks in the field 25 are placed on the various statement sheets in predetermined locations by suitable means such as a computer print-out. The presence or absence of a mark in any given one of the predetermined positions represents specific information. For example, a mark at location 60 on a particular depositor's statement indicates that no checks or deposit slips were run through that depositor's account during the month whereupon there are no related checks located at the high speed feeding station 28. Hence, in a manner to be described in detail later, the control circuit is operative in response to the sensing of such a mark at location 60 to prevent the high speed feeder from feeding checks when that particular depositor's statement is adjacent the high speed feeding station 28.

The presence of a second mark 64 on statement sheet 22 indicates that the account is an active one to the point where two or more statement sheets are required to list all of the depositor's checks and deposits during the month.

The next three mark positions in the indicia field 25 represent a binary coded decimal notation of the "units" digit corresponding to the number of checks or the like that were entered on the given depositor's statement during the month. For example, if the depositor's statement contained 56 entries, the units digit of this count would be "6." Hence, the mark position 65 which corresponds to a "1" would be blank, but the mark positions 66 and 67 corresponding to "2" and "4," respectively, would be marked as shown. The remaining mark position 68 in the right hand portion of the indicia field 25 represents a selection that the given depositor's statement be accompanied by material from the first insert station.

The marks in the indicia field 25 on the left side of the statement sheet 22 represent similar types of preselected control operations. For example, a mark in position 69 indicates that for some reason, the particular statement should be withheld from passage through the postage meter. One such reason might be that the statement relates to a fiduciary account under control of the bank itself and, therefore, is not to be mailed; or, perhaps the mark indicates that the related account is overdrawn or unusually active in which event, the statement and its checks should receive personal scrutiny prior to mailing. Where such is the case, a mark in position 69 is also operative to withhold sealing at the sealing station.

The remaining mark positions in the left hand indicia field 25 are used to indicate the "tens" digit for the number of entries on the particular statement during the month (in binary coded decimal form—BCD); the BCD "8" value used in the definition of the "units" digit; and a selection of whether the particular statement is to receive insert material from the second insert station. Of course, additional marks are placed on the statement where additional insert or stacking stations are used.

As noted above it is frequently convenient to use a computer's print out mechanism to place the control and count indicia on the main documents at the same time other information is printed thereon. In this manner, less computer time is required than if two separate printing operations are employed. For the same reason it is desirable to place the control and count indicia on the same lines of the document as other printing in order to avoid the need for a separate line of print to merely accommodate a single mark. It is preferred, therefore, that indicia for controlling the most commonly used machine operations be placed on those of the main document's print lines that also most commonly receive other printing such as names and addresses, for example. In this respect, however, one use of a machine embodying the invention might frequently require a given machine operation while another use of the same machine might only rarely perform that same machine operation. Hence, the structure about to be described includes a programmer for permitting a given control mark to selectively control different machine operations depending upon which are desired for use by the insertion machine at any given time.

As each statement sheet is passed under the photocells 26 and 27, suitable pulses are generated on lines 70 and 71 for delivery through amplifiers 72 and 73 to a first portion 75A of a programmer which directs the photocell pulses to selected AND gates of a set of AND gates 78. Similarly, timing pulses are synchronously and sequentially delivered by a timing control circuit 74 to a second portion 75B of the programmer which directs the timing pulses to second inputs of selected gates of the AND gate group 78. In this respect, these timing pulses are synchronised with the feeding of each main document by means of a pulse generated, for example, in response to either the feeding of the document's leading edge or perhaps motion of the feed mechanism itself. In this manner, as the feed-hold mark 60 passes under lamp 24, it causes the output level from photocell 27 to change and signals to be delivered to each of the first AND gate inputs selected by the programmer 75A as corresponding to the mark positions 60 and 64–68.

At the same time, in the case of a pulse derived from a mark at position 60, the tiing control circuit 74 delivers a pulse to programmer 75B which produces an output pulse to the second input of the feed-hold AND gate which is thereby adapted to deliver an output on line 80 to a memory circuit 82 upon receipt of a timing signal to be discussed shortly.

Although the remaining AND gates 78 corresponding to the marks in the right hand indicia field all receive first input pulses from programmer 75A at the same time as the feed-hold AND gate, they do not receive timing pulses from the control circuit 74 at that time. Hence, none of the other AND gates 78 are adapted to deliver signals to the memory 82 in response to the passage of a mark at position 60 under photocell 24. Of course, if there were no mark in position 60, there would be no first input to the feed-hold AND gate; and, at that time none of the AND gates would have been adapted to deliver signals to memory 82.

Signals representing the presence or absence of marks in the remaining positions of the indicia fields 25 are similarly adapted to be gated into the memory. But, such gating will not be further described in detail.

As noted above, some of the signals generated in response to the various marks in the indicia fields are suitably amplified and delayed prior to the time they are delivered to the actuators or the like which they are intended to control. Such delays, however, will be apparent to men skilled in the art and will not be discussed in detail. Similarly, some of the preferred embodiment's structures are actuated in response to receipt of positive signals on their control lines; and others are operative in response to negative such signals, but the instant application will not be incumbered with such details as the voltage levels of the various signals. Some of the preferred structure's delay operations are more pertinent to the practice of the invention, however, and will be described in more detail. For example, the memory 82 and a group of shift registers 84 are more significant and will be described shortly.

Normally, both drive chains for the insert track portions 10 and 12 are clutched together. As noted above, however, where a given depositor's statement is comprised of more than one sheet, the short chain is stopped to permit the second sheet to be fed onto portion 10 of the insert track. This situation is referred to as a "demand feed" condition. That is, the situation demands that the gripper feed 18 deliver at least one more document to the insert track before the previous document is moved on.

As a practical matter, particularly where the depositors' names, addresses, and account numbers are placed on the monthly statements by a computer, the various control indicia are placed on the statement sheets at the same time so as to avoid both separate subsequent printing operations and separate lines of print. But, where it is required that a depositor's entries be continued onto other statement sheets, the demand feed marks and BCD marks are printed on all of the subsequent sheets rather than the first. Hence, in order to effect the above described demand feed operation, it is necessary that the subsequent statement sheets be sensed by the photocells 26 and 27 before the prior statement sheet is moved into its second position (MC2 in FIG. 1) between the two feeders 18 and 28. It is also necessary, in order not to destroy the information that was generated in response to the control indicia on the prior statement sheet, that the signals generated in response to the prior sheet be stored until such time as the last sheet of a given statement is fed onto the first position of the insert track (MC1 in FIG. 1). The memory provides a structure for performing this intermediate storage or delaying function.

Any outputs from the AND gates 78 are delivered to the memory 82 in response to receipt by the AND gates of a special shift signal on line 87 from the timing control circuit 74. This special shift pulse occurs prior to the termination of a given machine cycle to clear the AND gates for receipt of information signals from the photocell 26 and 27 derived from the next statement sheet. In this regard, if a given depositor's account entries are carried over onto a second sheet there will be a mark at the demand feed position 64 on the second sheet of that depositor's statement. This mark is sensed by the photocell 27 and a representative signal is delivered through the programmer 75A and the demand feed AND gate to both the memory 82 and each of the control function shift registers in the group 84.

The output from the demand feed AND gate comprises a "demand override" signal and is also delivered on line 88 to the drive motor 16 via a chain hold amplifier 89 and line 88*a* in FIG. 1 to stop the first portion of the insert track 10. In this manner, the particular depositor's first statement sheet is not passed on to the MC2 position during the next machine cycle; and the signal from the demand feed AND gate to the memory prevents the information therein from being shifted into the shift registers 84 upon receipt of the next timing pulse on line 87. In this manner, the memory is adapted to receive signals representing control or count marks on any of the subsequent pages of a given depositor's statement.

Inasmuch as the second portion 12 of the insert track continues to move even though the first portion 10 has stopped, it will be apparent that "holes" will be built into the system. For example, during the next machine cycle the document packet located at MC1 in FIG. 1 is not moved toward the high speed feeder station. The demand override signal, however, causes the high speed feeder's shift register to be programmed to produce an output pulse on line 92 for high speed feeder control 94 which delivers a signal on line 95 to the high speed feeder 28 to prevent its operation when a "hole" is at the MC3 position of the insert track. Similarly, the demand override signal to an envelope shift register in the group 84 programs the envelope shift register to produce a signal on line 96 to an envelope feed control amplifier 97 and on to the envelope feeder 44 (FIG. 2) to prevent an envelope from being placed onto the insert track when the "hole" reaches position MC6 in FIG. 1. In this manner, unfilled envelopes are not permitted to be passed through the postage meter 56. The demand override signals are also delivered to the other control function shift registers in the group 84 so that the corresponding operation will be similarly precluded whenever a "hole" is adjacent the corresponding station.

At the termination of each machine cycle, the timing control circuit 74 produces a shift pulse on line 98 to each of the individual shift registers in the group 84. In this manner, the various control signals are delivered from the shift registers to their corresponding control amplifiers and actuator as indicated in FIG. 2 so that the selected functions are performed by the various stations (or selectively not performed in the event that the shift registers receive demand override signals as described above). In this regard, it should be noted that although the shift registers receive demand override signals as described above). In this regard, it should be noted that although the shift registers 84 are illustrated as a single block it will be appreciated that each will have a number of stages in accordance with the position of its station along the insert track. For example, the shift register for the first insert station might have only three stages in combination with a conventional delay circuit depending upon the number of insert stations which preceed it along the insert track. In the same manner, it might be convenient to place one of the stacking stations before the stuffing station, in which event, the lengths of the various shift registers would be adjusted accordingly.

The outputs from the shift registers 84 corresponding to the BCD count signals derived from the statement's count indicia are delivered on line 100 to a first compare circuit 101; and on line 102 to an "entry" display window device 103 on the display unit 38. At the same time, as described above, the photocell 33 delivers pulses through the counter 37 to a similar display window 104 on the display unit 38. The output of the counter 37 is delivered on lines 106 and 108 to the first compare circuit 101 and a second compare circuit 110.

As noted above, the count the display window 103 corresponds to the number of entries on a given depositor's monthly statement. This count, of course, should agree with the number of checks that are delivered from the high speed feeder and placed with that particular depositor's statement. In this respect, the number of that particular depositor's checks that are delivered by the high speed feeder is recorded in both the first counter 37 (electronically) and the left display window 104 (visually). Incidentally, in the preferred embodiment, the counter 37 and display window 104 are of the type which subtract 1 from the total count to account for the presence of the separator card 36 which, although not a check, nevertheless causes a count pulse to be delivered to the counter 37 by the photocell 33. In any event, if the number of checks or deposit slips delivered by the high sped feeder does not agree with the number of entries on the particular depositor's statement, neither the display windows 103 and 104, nor the input signals to the compare circuit 101 will agree. Consequently, the insertion machine's operator receives a visual indication that an error has been made; and an output signal on line 114 from the compare circuit 101 is similarly electronically indicative. This error signal on line 114 is delivered to an error stacker shift register 116 so that the error stacker is programmed to remove the packet containing the error from the insert track at the appropriate time by delivery through an amplifier 118 of a signal on line 120 to the error stacker 48. A corresponding signal is also delivered through a sealer amplifier 122 to the sealer actuator 46 on line 124 to prevent the particular envelope from being sealed.

The compare circuit 101's output-error signal is also delivered on line 132 to both a consecutive-error counter 134 which is reset by a "non-error" signal on line 138 during the next machine cycle for which the count signals on lines 100 and 106 are in agreement. Hence, the condition of the various stages in the consecutive-error counter 134 represents the number of times that the entries on consecutive statements have not been in agreement with the number of related checks fed from the high speed feeder. Consequently, the consecutive-error counter 134 only produces an output on line 140 when more than a predetermined number of consecutive errors have occurred. In one preferred embodiment of the invention, it was arbitrarily decided that if more than three such consecutive errors occurred, it was probably due to a machine malfunction per se rather than a loss of a check or two from each of three consecutively processed statements. The output signal on line 140, therefore, is operative to turn off the entire machine so that an investigation can be conducted to determine the cause of the errors.

Most insertion machines which include a postage meter use a fixed rate of postage. That is, it is assumed that all of the envelopes passing out of the machine will fall within the same postage-rate weight categories so that each will take the same amount of postage. But, in the newer more complex insertion machines where documents are selectively inserted from any one of a number of insertion stations, it is highly desirable that overweight envelopes be removed from the insert track before insufficient postage is affixed thereto. This is particularly the case in a bank statement machine where the number of checks is widely variable. In this regard, the instant structure performs this function by means of an overweight selector 140, the compare circuit 110, the overweight stacker 54, the mounter 37, and associated circuitry which are combined to remove overweight packets from the insert track.

More specifically, an initial determination is made of the average weight of an envelope containing a statement sheet and certain inserts. Next, a determination is made of the number of checks required to increase the overall weight of a given envelope and contents to an amount in excess of the postage for which the meter is set. This number of checks is entered into the overweight selector 140 which is operative to produce a signal on line 144 representative of the number of checks in excess of which would require additional postage; in other words, the number of checks that would make an envelope overweight. This entry is delivered on line 144 to the compare circuit 110 along with a signal on line 108 from counter 37 representing the number of a given depositor's checks that are to be mailed with the related statement. The compare circuit 110 produces an output on line 148 to an overweight shift register 149 when the signal on line 108 represents a count greater than that which is represented by the signal on line 144. In this manner, the overweight shift register is programmed to produce a signal on line 150 to an overweight amplifier 151 which delivers a signal on line 152 to suitably control the overweight stacker 54 for removal of overweight envelopes from the insert track prior to their passage to the postage meter 56.

The hold stacker 52, seal actuator 46, and remaining insert stations such as 42 are operated in response to output signals from their respective shift registers in a manner similar to that which has been described above. Hence, their operation will be apparent to men skilled in the art and will not be further discussed at this time. Similarly, it will be apparent that the various counters are suitably reset by timing signals from the control circuit 74 and that various delay circuits are employed so that the machine is conveniently timed. But such incidental matters are easily determined by means of a conventional timing diagram. Hence, neither a discussion of such delays nor a timing diagram will be presented because they are not believed necessary for the invention to be understood.

It will also be appreciated by those skilled in the art that although the invention has been described in specific terms various other modifications are equally in the scope of the invention. For example, as noted, the number of conventional insertion stations is almost limitless; and a plurality of high speed insertion stations can be easily included. In any event, the above described structure provides an insertion machine which permits a master document to not only selectively control a plurality of insertion stations, but also provide the basis for a subsequent determination that a given number of documents are in fact delivered from subsequent feeders or insertion stations as the case may be. Similarly, the above described machine performs its operations without a need for a separate control document while at the same time eliminating the need for one of the high speed feeders which have previously been used on more complex insertion machines. Finally, it will be appreciated that the multi-segment insertion track described above, provides an insertion machine which, although having a continuous insert track as such, is able to have independent regulation of the various segments thereof so as to permit the use of conventional feeders while nevertheless obtaining the benefits of demand feeding.

While the invention has been particularly shown and described with reference to a preferred embodiment thereof, it will be understood by those skilled in the art that various changes in form and details may be made therein without departing from the spirit and scope of the invention. For example, although the invention has been described in terms of reflective sensing, the invention is equally as applicable to documents having magnetically coded indicia thereon. Also, binary coding can be used on the master document instead of the BCD structure, and, even character recognition principles can be employed to drive signals indicating the number of entries appearing on a given master document such as the statement of the preferred embodiment. Similarly, the main or master document can also employ a customer identification code that is matched with a corresponding customer identification code on documents fed from the high speed feeder. These modifications will be apparent, however, and need not be described.

The embodiments of the invention in which an exclusive property or privilege is claimed are defined as follows:

1. In an insertion machine of the type in which groups of documents are moved at a given rate past a different one of a plurality of operating stations during each machine cycle, and wherein each group of documents is comprised of at least one main document having prerecorded control indicia thereon, said insertion machine comprising:

- a main document feed station adapted to hold main documents;
- first feeding means for feeding said documents from said main document feeding station onto an insert track;
- a subordinate document feed station for holding a plurality of sets of subordinate documents wherein each different set is associated with a different one of said main documents;
- second feeding means for feeding said subordinate documents onto said insert track;
- means for sensing said prerecorded indicia on said main documents wherein said indicia include count indicia for indicating the number of associated subordinate documents that are to be fed from said second feeding means;
- means for generating count indicia signals representing the presence and absence of such count indicia;
- counting means for counting the number of said associated subordinate documents that are fed by said second feeding means and generating signals representative thereof; and,
- comparing means for comparing said count indicia signals derived from said main document and said signals representing the number of associated subordinate documents fed from said second feeding means and generating an error signal signal for indicating that the desired number of associated subordinate documents have not been fed by said second feeding means.

2. The apparatus according to claim 1 wherein said first feeding means delivers only a single document during each machine cycle and said second feeding means is a high speed feeder for feeding a plurality of documents during a given machine cycle.

3. The apparatus according to claim 1 wherein said sets of subordinate documents are separated by a separator document for indicating that said second feeding means has fed all of the subordinate documents of a given set; and

- said counting means includes subtracting means to account for the feeding of said separator document by subtracting one from its total count of said given set of documents fed by said second feeding means.

4. The apparatus according to claim 1 wherein said comparing means includes means for generating a non-error signal and including:

- a second counter;
- means for delivering said error signals to said second counter;
- means for delivering said non-error signal to said second counter for resetting said second counter so that the count in said second counter at any given time represents the number of consecutive times that the desired number of associated subordinate documents have not been fed by said second means; and,
- means operative in response to a predetermined count in said second counter for indicating that greater than a predetermined number of consecutive such errors have occurred.

5. The apparatus according to claim 1 including an error stacker; and,

- means for delivering said error signal to said error stacker which is operative in response to receipt of said error signal to remove the related group of documents from said insert track.

6. The apparatus according to claim 1 wherein a stuffing means stuffs each of said groups of documents into an envelope and a sealer seals said envelopes and including:

- means for delivering said error signal to said sealer which is operative in response to receipt of said error signal to withhold the sealing of the envelope into which the related group of documents has been stuffed.

7. The apparatus according to claim 1 including a hold stacker and wherein said prerecorded indica include hold-stacker control indicia for controlling said hold stacker, said sensing means being operative in response to the sensing of said hold-stacker control indicia to generate a hold-stacker signal, said apparatus including:

- means for delivering said hold-stacker signal to said hold stacker which is operative in response thereto for removing the related group of documents from said insert track.

8. The apparatus according to claim 7 wherein a stuffing means stuffs each of said groups of documents into an envelope and a sealer seals said envelopes and including:

- means for delivering said hold-stacker signal to said sealer which is operative in response to receipt of said hold-stacker signal to withhold sealing of the envelope into which the related group of documents has been stuffed.

9. The apparatus according to claim 1 including an overweight selector for generating an overweight signal representing a predetermined number of subordinate documents which, if placed on said insert track with a given group of documents, will cause said given group to weigh more than a predetermined amount;

- a second comparing means;
- means for delivering to said second comparing means said signals representing the number of subordinate documents fed by said feeding means for placement on said insert track with said given group of documents; and,
- means for delivering said overweight quantity signal to said second comparing means for generating an overweight signal when the number of subordinate documents fed by said second feeding means is greater than the number of documents represented by said overweight quantity signal.

10. The apparatus of claim 9 including an overweight stacker; and, means for delivering said overweight signal to said overweight stacker which is operative in response to receipt of said overweight signal to remove the related group of documents from said insert track.

11. In an insertion machine of the type in which groups of documents are moved on an insert track at a given rate past a different one of a plurality of operating stations during each machine cycle, and wherein each group of documents is comprised of at least one main document having prerecorded control indicia thereon, said insertion machine comprising:

a main document feed station located adjacent a first portion of said insert track and adapted to hold main documents;

first feeding means for feeding said documents from said main document feeding station onto said first portion of said insertion track; said first portion being operative to move said main documents away from said main document feeding station onto a second portion of said insertion track which is operative to receive said main documents from said first portion and move said documents past the remaining operating stations;

sensing means for sensing said control indicia on said main documents as said main documents are fed onto said first portion of said insert track by said first feeder and generating control signals representing the presence and absence of said control indicia;

said control indicia including demand feed indicia, the demand feed signal representative thereof indicating that a given main document is followed by at least one related document to be included in the same group of documents; and, means operative in response to receipt of said demand feed signal for terminating operation of said first portion of said insert track until at least after the next main document has been fed onto said first portion so that said first portion is stationary, but said second portion continues to move previously fed documents past said remaining operating stations.

12. The apparatus according to claim 11 including a plurality of control shift registers corresponding to said operating stations;

gating means for gating said control signals into said control shift registers which are operative to provide operating control signals for controlling the operation of their corresponding operating stations when related main documents are respectively adjacent thereto; and, means for delivering said demand feed signals to said control shift registers, said demand feed signal being operative to selectively inhibit operation of said control shift registers during subsequent machine cycles to prevent operation of the corresponding operating station when there are no document groups adjacent thereto.

13. The apparatus according to claim 12 wherein said gating means includes a memory and a plurality of AND gates and including:

means for generating a first set of timing signals and second and third timing signals in timed relationship to the feeding of said main documents past said sensing means onto said first part of said insert track, said first set of said timing signals being sequentially generated as said control indicia are sensed, said second timing signal being generated after said control indicia are sensed, but before the termination of the particular machine cycle, and said third timing signal being generated upon termination of said machine cycle;

means for delivering said control signals and said first set of timing signals to said AND gates, each of said AND gates being adapted in response to simultaneous receipt of both a control signal and one of said first timing signals to provide an output signal, and each of said AND gates being operative in response to receipt of said second timing signal to deliver such output signal to a corresponding section of said memory to thereby leave said AND gates free to receive subsequent suitably timed control signals from the next main document, said first feeding means being operative to feed the next main document prior to termination of the machine cycle corresponding to the first main document;

means for delivering said third timing signal to said memory for delivering the thusly gated control signals to corresponding ones of said control shift registers, but said memory being inhibited from thusly delivering said control signals to said control shift registers upon receipt of a demand feed signal from the next main document.

14. The apparatus of claim 13 including programming means for selectively directing said control signals and said set of first timing signals to selected ones of said AND gates for permitting different control indicia to control selected machine operations.

15. The apparatus according to claim 11 wherein said pre-recorded indicia include count indicia and including:

a subordinate document feeding station for holding a plurality of sets of subordinate documents wherein each different set is associated with a different one of said main documents;

second feeding means for feeding said subordinate documents onto said second portion of said insert track;

said sensing means being further operative to sense said count indicia and generate count indicia signals indicating the number of associated subordinate documents that are to be fed from said second feeding means;

counting means for counting the number of said associated subordinate documents that are fed by said second feeding means and generating signals representative thereof; and, comparing means for comparing said count indicia signals derived from said main document and said signals representing the number of associated subordinate documents fed from said second feeding means and generating an error signal for indicating that the desired number of associated subordinate documents have not been fed by said second feeding means.

16. The apparatus according to claim 15 wherein said first feeding means delivers only a single document during each machine cycle and said second feeding means is a high speed feeder for feeding a plurality of documents during a given machine cycle.

17. The apparatus according to claim 15 wherein said sets of subordinate documents are separated by a separator document for indicating that said second feeding means has fed all of the subordinate documents of a given set; and said counting means includes subtracting means to account for the feeding of said separator document by subtracting one from its total count of said given set of documents fed by said second feeding means.

18. The apparatus according to claim 15 wherein said comparing means includes means for generating a non-error signal and including:

a second counter;

means for delivering said error signals to said second counter;

means for delivering said non-error signal to said second counter for resetting said second counter so that the count in said second counter at any given time represents the number of consecutive times that the desired number of associated subordinate documents have not been fed by said second means; and, means operative in response to a predetermined count in said second counter for indicating that greater than a predetermined number of consecutive such errors have occurred.

19. The apparatus according to claim 15 including an error stacker; and means for delivering said error signal to said error stacker which is operative in response to receipt of said error signal to remove the related group of documents from said insert track.

20. The apparatus according to claim 15 wherein a stuffing means stuffs each of said groups of documents into an invelope and a sealer seals said envelopes and including:

means for delivering said error signal to said sealer which is operative in response to receipt of said error signal to withhold the sealing of the envelope into which the related group of documents has been stuffed.

21. The apparatus according to claim 15 including a hold stacker and wherein said prerecorded indica include hold-stacker control indicia for controlling said hold stacker, said sensing means being operative in response to the sensing of said hold-stacker control indicia to generate a hold-stacker signal, said apparatus including:

means for delivering said hold-stacker signal to said hold stacker which is operative in response thereto for removing the related group of documents from said insert track.

22. The apparatus according to claim 21 wherein a stuffing means stuffs each of said groups of documents into an envelope and a sealer seals said envelopes and including:

means for delivering said hold-stacker signal to said sealer which is operative in response to receipt of said hold-stacker signal to withhold sealing of the envelope into which the related group of documents has been stuffed.

23. The apparatus according to claim 15 including an overweight selector for generating an overweight signal representing a predetermined number of subordinate documents which, if placed on said insert track with a given group of documents, will cause said given group to weigh more than a predetermined amount;

a second comparing means;

means for delivering to said second comparing means said signals representing the number of subordinate documents fed by said feeding means for placement on said insert track with said given group of documents; and, means for delivering said overweight quantity signal to said second comparing means for generating an overweight signal when the number of subordinate documents fed by said second feeding means is greater than the number of documents represented by said overweight quantity signal.

24. The apparatus of claim 23 including an overweight stacker; and, means for delivering said overweight signal to said overweight stacker which is operative in response to receipt of said overweight signal to remove the related group of documents from said insert track.

References Cited

UNITED STATES PATENTS

| | | | |
|---|---|---|---|
| 3,260,517 | 7/1966 | Sather | 270—58 |
| 3,490,761 | 1/1970 | Bell | 270—58 |

LAWRENCE CHARLES, Primary Examiner

U.S. Cl. X.R.

270—58